United States Patent Office 3,432,453
Patented Mar. 11, 1969

3,432,453
DE-IONIZING TREATMENT FOR PHENOLIC
RESINS USING A SOLUBLE AMMONIUM
SALT
Kurt Paul Gladney, Sarnia, Ontario, and Hendrik Herman
Jan Deuzeman, Watford, Ontario, Canada, assignors to
Fiberglas Canada Limited, Toronto, Ontario, Canada
No Drawing. Filed Dec. 2, 1964, Ser. No. 415,457
Claims priority, application Canada, Oct. 5, 1964,
913,213
U.S. Cl. 260—29.3          9 Claims
Int. Cl. C08g 51/24, 37/08

ABSTRACT OF THE DISCLOSURE

In the formation of a resin solution, the removal of residual magnesium, calcium, strontium and barium catalyst ions is effected by treatment with an ammonium salt having an ion which forms an insoluble salt with the residual metal ion at a pH of from 4.5 to 6.5 and subsequently raising the pH to above 7 by the addition of ammonia.

The present invention relates to the production of aqueous solutions of phenol-aldehyde resins such as are useful for bonding together mineral wool fibres, for example, glass fibres in the formation of fibrous insulation material.

In the manufacture of insulating fibrous products, water miscible phenol-formaldehyde resins (or their condensates with related resin forming substances) have been used as bonding materials for the fibres, such as glass fibres, in order to impart integrity of shape and physical properties to the finished product. In nearly all cases, it is necessary to blend the phenolic resin with other substances in liquid form to impart desirable characteristics to the product, e.g., with mineral oil emulsions to act as lubricants. In many cases, such other substances are used as cost-reducing extenders.

The phenolic resin and the extenders are blended in aqueous solution prior to applying the "binder" to the glass (or other mineral) fibres being formed and collected. Uniformity and stability during prolonged storage and under exposure to such conditions as agitation, aeration, etc. are essential in these binder mixtures but not always readily achievable.

Phenol-formaldehyde, and similar resins are among the oldest synthetics and their chemistry and basic methods of manufacture are well described in literature. Nevertheless, the formulation and the manufacture of resins of advantageous characteristics for a specific end use remains somewhat of an art, partly because the "advantageous characteristics" vary from plant to plant, from machine to machine and/or from product to product.

The type of phenol-formaldehyde resin produced for use as a bonding agent for glass or mineral wool fibers in the manufacture of insulating materials is commonly referred to as a water soluble or resol type phenol-formaldehyde resin. Commonly known, too, are the principal features of the process outlined below, even though proportions of the reactants, catalysts, temperatures, apparatus and end products may vary to quite a degree.

Phenols and an aqueous solution of formaldehyde in commercially available grades are blended in controlled proportions which affect the properties of the end product. Reaction vessels for this process are equipped with means for agitation and temperature control, and, often also with vacuum and reflux cooling attachments.

Catalysts are required to start the condensation reaction between phenol and aldehyde. Caustic substances such as caustic soda, caustic potash, barium hydrate are examples of suitable catalysts. Quantity, concentration and rate of addition of catalyst affects the progress of the exothermic condensation reaction. The choice of catalyst determines—among others—the nature and amount of inorganic ash present in the resin after completion of the cook cycle and neutralization with a suitable acid. This point is important because the nature and amount of ash significantly affect the curing behavior of the resins. Moreover, it affects the finished product significantly. In the absence of water soluble ash salts, Fiberglas fibers will withstand atmospheric attack considerably better and so will the resin to glass bond. Ultimately, this means that the products will retain their resilience and dimensional integrity, a great deal longer, with barium catalysed resins, than with soluble ash resins.

Given chemically constant raw materials, the characteristics of a water miscible phenolic resin are affected by three major variables in the process of making the resin:

(a) The mol ratio between the resin-forming raw materials,
(b) Temperature-time cycle of cooking,
(c) Quantity and nature of the catalyst used.

The present invention is concerned with the latter variable. In the first place, the type and quantity of the catalyst determines the molecular structure of the phenol-formaldehyde resin and thus, its curing behavior. Secondly, although commonly the bulk of the catalyst is inactivated at the completion of the cooking cycle and before storage, unreacted remnants and reaction products remain in the phenolic resin after inactivation.

In past practice, essentially inorganic bases (or acids) have been used as catalysts in technical water miscible phenolic resins. The inactivation upon completion of the cook is then done by neutralizing the basic catalyst with an acid (or the acid catalyst with a base). Depending on the choice of base and acid, more or less soluble reaction products result, which can be left in the aqueous resin or removed by filtration according to their solubility. In bonding together glass fibres use has commonly been made of resins using sodium hydroxide catalyst and e.g. phosphoric acid for inactivation, with subsequent filtration ("Filtered Resins") or using sodium hydroxide catalyst and hydrochloric or sulphuric acid ("Soluble Ash Resins") for inactivation to a final pH between 7.0 and 8.0. The presence of sodium chloride or sodium sulphate in the finished resin and in binder made from it was considered acceptable for many products as was the presence of residual quantities of sodium hydroxide. Savings over the cost for filtration were tangible.

The inadequacy of "soluble ash" resins with their particular storage and cure characteristics and with their content of electrolyte was first observed on products with specially fine fibre and high binder content. Development work has been undertaken in two directions:

1. Attempts to remove all electrolytes from the aqueous resin by an ion exchange process.
2. Development of an "insoluble ash" resin, based upon the use of barium hydroxide as the catalyst, and neutralized by sulphuric acid to a pH=7.2 to 7.3 at room temperature.

Both approaches have been successful. The ion exchange method is based upon soluble ash compositions from which all ions are removed by contact with ion exchange resins. The capital cost of the installation is, however, such that it is justified only for special products.

The use of barium hydroxide as a catalyst with subsequent inactivation to barium sulphate has been found useful since the characteristics of the phenol-formaldehyde resins so formed are superior to those of sodium hydroxide catalyzed resins. Moreover, the absence of electrolytes approaches that of the de-ionized resin, without capital cost for de-ionizing equipment.

However, the use of a barium hydroxide catalyst has been restricted to some extent because of operational difficulties connected with the resulting resins, such as blocking of binder transfer lines with barium sulphate. These difficulties become pronounced under circumstances which necessitate the use of more concentrated formulations, of better shelf-life and smaller particle size.

It has been known that the barium sulphate which forms when neutralizing the catalyst to a pH=7.2 with sulphuric acid at the end of the resin cooking cycle will stay in suspension indefinitely provided care is taken to avoid excessive acid concentrations anywhere in the resin kettle at any time. In applicant's operation, blocking of lines and filters occurred only in binder mixes containing along with the resin either a mineral oil emulsion or an emulsion of such "naval stores" products as those sold under the trademark "Vinsol." The Vinsols are dark-coloured resins of uncertain composition with a high softening point sold by Hercules Chemical Company. These emulsions deteriorated in the presence of the resin.

It has now been found that the emulsifying agents which are used to hold the mineral oil or the resin in the stable emulsion react with residual barium hydroxide to form insoluble soaps or similar compounds, thus losing their emulsifying properties for mineral oil, etc.

Examples of some emulsifying agents which are used in this connection are ammonium caseinate for resin emulsion, ammonium stearate for oil emulsion, or such other surface active agent as "Morpel," a petroleum sulfonate material sold by Charles Pfizer Co. Such precipitation of the emulsifier leads, of course, to instability of the emulsion.

Some barium hydroxide is, of course, left over when the resin is neutralized no further than to a pH=7.2 with sulphuric acid. It has been found, in general, that the presence of free barium hydroxide, no matter how small the quantity, is objectionable when working with otherwise very desirable binder materials which can form water insoluble barium compounds. Moreover, in general the invention is applicable wherever the phenol-formaldehyde resin is to be mixed with material that is adversely affected by free barium hydroxide. This may involve the formation of, for example, barium lignate if the resin is being added to a material containing lignin or as above, it may involve withdrawal of an emulsifying agent.

Evidently, the difficulties which result from the presence of traces of barium hydroxide could be overcome by removing from the aqueous resin solution the traces of barium hydroxide. Unfortunately, precipitation of all of the barium ions by the use of sulphuric acid cannot be effected without simultaneously causing two undesirable effects. First of all, when barium sulphate is formed at a pH which would yield a resin solution free from barium ions the precipitate is coarse and tends to settle readily and it would therefore have to be removed by filtration in order to obtain a satisfactory product. Secondly, the molecular structure of the phenol-formaldehyde resin is adversely affected with the result that its water miscibility is reduced.

The above discussion has outlined difficulties encountered when using barium hydroxide as the catalyst. Similar difficulties also arise when using as catalysts, the hydrates of certain other metals of Group II, namely, magnesium hydroxide, calcium hydroxide or strontium hydroxide. When using calcium hydroxide or strontium hydroxide, sulphuric acid is normally employed as the precipitant, as in the case of barium hydrate. When using magnesium hydroxide as catalyst, the usual precipitant is phosphoric acid since magnesium phosphate is highly insoluble. When iron is present the use of phosphate as the precipitant is desirable because it tends to complex the iron to reduce discoloration caused by iron. Also, the presence of phosphate has been found to improve the curing characteristics. Carbonates could also be employed and would form insoluble carbonates. The alkaline earth metal hydroxide may be derived from any suitable source such as the oxide or a hydrate.

It is an object of the invention to provide a method of removing ions of magnesium, calcium, strontium or barium from an aqueous solution of a phenolic resin without the necessity for effecting filtration of a precipitate.

Accordingly, the invention provides a process for removing from an aqueous solution of a phenol-aldehyde resin free ions of a metal selected from the group comprising magnesium, calcium, strontium and barium comprising treating said solution with an aqueous solution of an ammonium salt having an anion which forms an insoluble salt with said metal ions to bring the pH of said solution to a value below 7.0 but not less than 4.5 and subsequently raising the pH to about 7 by addition of aqueous ammonia.

The invention is broadly applicable to the treatment of aqueous solutions of phenol-aldehyde resins in general, which contain free ions of magnesium, calcium, strontium or barium. Typical resins mol ratios used are, for example, between 1.90 mol of formaldehyde to 1 mol of phenol and 2.5 mols formaldehyde to 1 mol phenol. Similar ranges are found to be useful for the other types of resins useful in practising this invention, such as phenol-melamine formaldehyde and phenol-dicyandiamide formaldehyde resin, and other modified phenolic resin.

A preferred group of phenolic resin solutions which may be treated by the method of the invention are those containing phenol-formaldehyde resins, or modified phenol-formaldehyde resins, which contain from 1.9 to 2.5 mols of formaldehyde to one mol of phenol and which are formed by heating the phenol and formaldehyde together in the presence of an appropriate amount of magnesium hydroxide or hydrate, calcium hydroxide, strontium hydroxide, or barium hydroxide under reaction conditions conventionally used for the production of an aqueous solution of such resins.

The process of the invention may be sed for the treatment of solutions of resins which contain unreacted formaldehyde as well as solutions which are free from unreacted formaldehyde. Where free formaldehyde is present the ammonia which is produced during reaction of the ammonium salt with the hydroxide of magnesium, calcium, strontium or barium reacts with the free formaldehyde. It has been found experimentally that free formaldehyde contributes very greatly to the success of the neutralization reaction.

Ammonium salts are generally preferred for the precipitating agent as they have advantages over salts containing other cations. For example, ammonia performs a useful function by combining as above with free formaldehyde present to form hexamethylene tetramine. Hexamethylene tetramine formation contributes to the efficiency with which the resol or a resol-Vinsol blend are transformed from the aqueous suspension into a fully cured thermosetting resin. However, the use of such other materials as quaternary ammonium salt is also envisaged in the present invention.

The final pH of the resin solution is preferably at least 6.5 and more preferably between 7 and 7.3. However, solutions of higher pH may be required for specific purposes.

When using the method of the invention it is found that the free hydroxide of barium or other metal is removed from the aqueous solution of the phenolic resin with the formation of barium sulphate or other insoluble salt as a finely dispersed precipitate which can be allowed to remain in the product without danger of sedimentation. At the same time, it is found that there is relatively very little degradation of the phenolic resin of the kind which is encountered when using a precipitant such as sulphuric acid. The raising of the pH to a value of about 7 after precipitation of the barium or other metal ion has been achieved, arrests any adverse effect on the molecular structure of the phenolic resins and the amount of time required to achieve precipitation of the insoluble metal salt is not so long that appreciable degradation of the phenolic resin can take place. The necessary time is usually 10–30 minutes.

It will be appreciated that the aqueous solutions of phenolic resin obtained by the method of the invention, which are substantially free from residual barium hydroxide or hydroxide of one of the other specified Group II metals, can be used in conjunction with bonding materials or other additives that are incompatible with phenolic resin solutions containing residual catalysts. It is therefore feasible to use such aqueous phenolic resin solutions in conjunction with a variety of economically and chemically desirable additives that could not conveniently be used with the phenolic resin solutions of the prior art.

It will be further be appreciated that the method of the invention involves the carrying out of a buffered reaction during which the rate of formation of barium sulphate or other insoluble salt of one of the metals magnesium, calcium, strontium or barium is controlled by the evolution of ammonia which in turn can react initially with the free formaldehyde present in the aqueous resin.

The following examples are given by way of illustration and without limitation.

EXAMPLE 1

Phenol: 1 mol.
Formaldehyde 1.9 mol.
Sodium hydroxide catalyst 3.6% based on phenol.
Blend weighed quantities of phenol and formaldehyde under agitation.
Verify mol ratio by means of refractive index.
Establish reaction temperature 110° F.
Add sodium hydroxide solution at a controlled concentration and rate, while agitating.
Maintain reaction temperature 110° F., by cooling or heating, for 3 hours.
Raise temperature to 140° F. and maintain for 2 hours.
Raise temperature to 150° F. and maintain until a free formaldehyde of 4.6%, or any other desired property of the resin, is reached.
Arrest the condensation reaction by cooling and neutralization with dilute hydrochloric acid.
Resins of this kind contain about 40% of phenol-formaldehyde condensate and 60% water. For shipment it is customary to remove water by vacuum distillation at low temperature until a 50% concentration is reached, followed by cooling to storage and shipping temperature of about 45° F. This formulation yields a "soluble ash" type of binder.

EXAMPLE 2

(Barium catalyzed resin 2.4:1. Neutralize with $H_2SO_4$, slow cycle.)
Phenol: 1 mol.
Formaldehyde solution: 2.4 mol.
Barium hydroxide (catalyst) solution 7.3% based on phenol.
Blend controlled quantities of phenol and formaldehyde under agitation.
Verify mol ratio by means of refractive index or other physical property.
Establish reaction temperature: 110° F.
Add barium hydroxide solution at controlled concentration and rate while agitating.
Maintaining reaction temperature at 110° F., by cooling or heating, for 5 hours.
Raise the temperature to 130° F. and maintain for 4 hours.
Raise the temperature to 140° F. and maintain until a free formaldehyde of 4.4% or any other desired property of the resin is attained.
Arrest the condensation reaction by cooling and with dilute sulphuric acid pH at 7.3.

The barium sulphate formed can (but need not) be removed by filtration. This formulation yields an "insoluble ash" type of binder.

EXAMPLE 3

Preparation of an insoluble ash resin

Mol ratio: 2.48 mols formaldehyde to 1 mol of phenol.
Blend 1000 imp. gals. phenol with aqueous formaldehyde as per above ratio.
Catalyze with 1200 lbs. barium-pentahydrate crystals, or equivalent quantity of barium oxide, or other water soluble hydrate.
Cook the blend at a suitable time-temperature cycle.
Finish cycle before water dilutability becomes measurable. Resols which have been condensed longer contain a higher proportion of molecules which are no longer soluble in water, and will show up as a turbidity, or precipitate when water is added to the resol.
Use dilute sulphuric acid to reduce the pH of the resin cook to 7.0–7.4.

EXAMPLE 4

Preparation of an insoluble ash resin modified

Mol ratio: 2.48 mols formaldehyde to 1 mol of phenol.
Blend 1000 imp. gals. phenol with aqueous formaldehyde as per above ratio.
Catalyze with 1200 lbs. barium pentahydrate crystals or equivalent quantity of barium oxide or other water soluble hydrate.
Cook the blend at a suitable time-temperature cycle.
During the cycle add 333 lbs. of a suitable glycol to impart modified curing characteristics.
Finish the cycle as predetermined.
Use dilute sulphuric acid to reduce the pH of the resin cook to 7.0–7.4.

EXAMPLE 5

Preparation of a melamine phenol formaldehyde resin

Mol ratio: 2.42 mols formaldehyde to 1 mol phenol.
Blend 700 imp. gals. phenol with aqueous formaldehyde as per above ratio.
Catalyze with 900 lbs. barium pentahydrate crystals, barium, oxide or other water soluble hydrate.
Cook the blend at a suitable time-temperature cycle.
During the cycle add 3000 lbs. of melamine crystals to the blend to impart desirable curing and flame retardant characteristics.
Finish the cycle as predetermined.
Use dilute sulphuric acid to reduce the pH of the resin cook to 7.0–7.4.

EXAMPLE 6

Preparation of a dicyandiamide-phenol formaldehyde resin

Mol ratio: 242 mols formaldehyde to 1 mol of phenol.
Blend 700 imp. gals. phenol with aqueous formaldehyde as per above ratio.
Catalyze with 900 lbs. barium pentahydrate crystals, barium oxide or other water soluble hydrate.
Cook the blend at a suitable time-temperature cycle.
During the cycle add approx. 20% of the phenol weight of dicyandiamide crystals to the blend, to impart desirable characteristics.
Finish the cycle as predetermined.
Use dilute sulphuric acid to reduce the pH of the resin cook to 7.0–7.4.

EXAMPLE 7

A barium hydroxide catalysed water miscible phenolic resin is formulated, catalysed with barium hydroxide and cooked in a suitable cycle such as a cycle consisting of 4 hours at 120° F. and 4 hours at 150° F. When the reaction has been carried to an end point characterized among others by 4 to 5% of unreacted ("free") formaldehyde, the reaction is stopped by reducing the temperature of the resin mixture and by adding under agitation sulphuric acid (30–35% concentration) until the pH of the mix is reduced to the range of 7.0 to 7.3 and preferably 7.2 to 7.3. When completely cooled, this resin is pumped to cold storage.

Before using the resin in conjunction with extenders which objectionably react with residual barium hydroxide, a quantity of resin is pumped from the cold storage tank into a binder mixing tank. Aqueous ammonium sulphate solution (10% by weight and pH of approximately 6.2–6.4) is added under agitation in a rate controlled so as to reduce the pH of the tank content to below 7.0 but not less than 4.5 in a predetermined span of time. The reaction is permitted to continue for a controlled length of time only sufficient to react all residual barium hydroxide to precipitate barium sulphate, but not long enough to adversely affect the molecular structure of the phenolic resin. This is generally 10–30 minutes. To stop the reaction, the pH is raised back to about 7 by adding aqueous ammonia.

It is found that an aqueous solution of phenol-formaldehyde resin produced in this manner can be mixed with additives such as mineral oil emulsions and emulsions of Vinsol or Solo and that the use of binders thereby obtained is found to overcome such difficulties as blocking of binder transfer lines and filters.

EXAMPLE 8

Binder formulation example using insoluble ash or insoluble ash modified resins treated with ammonium sulphate in accordance with the preceding examples.

Phenolic resin (2.48:1) 281 imp. gals. or
Phenolic resin, modified (2.48:1).
Vinsol emulsion (40% solids) 135 imp. gals.
Mineral oil emulsion 36.5 imp. gals.
Ammonium sulphate solution (10%) approx. 9.5 imp. gals.
Ammonia 15 imp. gals.
Water to make 1000 imp. gals.

Mixing procedure (under agitation)

Pump the resin into a mixing tank.
Add ammonium sulphate solution to adjust pH to 5.0.
Agitate 10 minutes.
Add water.
Add ammonia.
Add Vinsol emulsion.
Add oil emulsion.

The embodiments of the invention in which an exclusive property or privilege is claimed are defined as follows:

1. A process for removing ions of a metal from the group consisting of magnesium, barium and strontium from an aqueous solution of a phenol-aldehyde resin comprising adding to said solution a soluble ammonium salt having an anion which forms an insoluble salt with said metal ions in an amount sufficient to bring the pH of the said solution to from 5.0 to 6.5, and subsequently raising the pH of said solution to about 7.0 by addition thereto of ammonia.

2. A process for removing barium ions from an aqueous solution of a phenol-aldehyde resin comprising adding to said solution ammonium sulfate in an amount sufficient to bring the pH of said solution to below 7.0 but not less than 4.5, thereby precipitating barium sulfate and then raising the pH of the solution to at least 7.0 by addition of aqueous ammonia thereto.

3. A process as in claim 2 in which the treatment time with ammonium salt is from 10 to 30 minutes.

4. A process as in claim 2 in which the phenol aldehyde resin contains free formaldehyde.

5. A process according to claim 1 in which the anion is a member of the group consisting of sulfate, phosphate and carbonate.

6. A process as in claim 1 in which the resin is a phenol aldehyde resin having a mol ratio in the range of 1.9 to 2.5 mols of formaldehyde to 1 mol of phenol.

7. A process as in claim 1 in which the resin is a modified phenol formaldehyde type resin chosen from the group comprising phenol melamine formaldehyde and phenol-dicyandiamide formaldehyde resins.

8. A process as in claim 1 in which the final pH of the solution is between 6.5 and 7.3.

9. A process as in claim 1 in which the final pH of the solution is between 7 and 7.3.

References Cited

UNITED STATES PATENTS 2,288,533   6/1942   Kreidl et al. _____ 260—57
3,067,172   12/1962  Carlstrom _____ 260—60

WILLIAM H. SHORT, *Primary Examiner.*

HOWARD SCHAIN, *Assistant Examiner.*

U.S. Cl. X.R.

260—19, 59, 60; 117—124, 141, 161; 210—54